United States Patent [19]

Corbin et al.

[11] Patent Number: 5,073,690
[45] Date of Patent: Dec. 17, 1991

[54] LONG LASTING ELECTRICAL DISCHARGE MACHINE WIRE GUIDE

[75] Inventors: Lawrence W. Corbin; Charles Carson, both of Fort Wayne; Jule L. French, Yoder; Dwight P. Bieberich; Donald E. Bieberich, both of Fort Wayne, all of Ind.

[73] Assignee: Fort Wayne Wire Die, Inc., Fort Wayne, Ind.

[21] Appl. No.: 314,652

[22] Filed: Feb. 23, 1989

[51] Int. Cl.$^5$ .............................................. B23H 7/10
[52] U.S. Cl. ................................................. 219/69.12
[58] Field of Search ........................... 219/69.12, 69.15

[56] References Cited

U.S. PATENT DOCUMENTS

| | | | |
|---|---|---|---|
| 3,775,580 | 11/1973 | Scherbaum | 219/69.15 |
| 4,611,107 | 9/1986 | Inoue | 219/69.12 |
| 4,613,740 | 9/1986 | Ichikawa | 219/69.12 |
| 4,686,344 | 8/1987 | Nakayama | 219/69.12 |
| 4,883,933 | 11/1989 | Yatomi et al. | 219/69.12 |

FOREIGN PATENT DOCUMENTS

| | | |
|---|---|---|
| 55-70529 | 5/1980 | Japan . |
| 55-125943 | 9/1980 | Japan . |
| 55-150936 | 11/1980 | Japan . |
| 56-76337 | 6/1981 | Japan . |
| 56-82133 | 7/1981 | Japan . |
| 297027 | 12/1986 | Japan ................................. 219/69.12 |
| 278725 | 11/1988 | Japan ................................. 219/69.12 |
| 63-193623 | 12/1988 | Japan . |

OTHER PUBLICATIONS

N. Kinoshita, "Study on Wire—EDM: Accuracy in Taper-Cut", Annals of the CIRP, vol. 36/1/1987.

Primary Examiner—Geoffrey S. Evans
Attorney, Agent, or Firm—George Pappas

[57] ABSTRACT

A multidirectional electrical discharge machine wire guide that is long-lasting and easily manufactured and, wherein the guide member thereof is not subject to dislodging. The guide member is made of a wear-resistant material, such as diamond or the like, and includes a wire hole for receiving a wire electrode therethrough and guiding the wire. A non-conductive member is provided and prevents electrical current flow between the wire electrode and the guide assembly at an area substantially near the guide member. The non-conductive member can surround and support the guide member on a wire guide body or, in the alternative, may be separate from the support member.

21 Claims, 5 Drawing Sheets

LONG LASTING ELECTRICAL DISCHARGE MACHINE WIRE GUIDE

TECHNICAL FIELD

The present invention relates to the technical field of electrodischarge machine (EDM) apparatuses having a traveling wire electrode. More specifically, the present invention relates to EDM wire guides used for accurately locating the traveling wire electrode with respect to the workpiece and for cutting desired shapes in the workpiece.

BACKGROUND OF THE INVENTION

EDM apparatuses utilizing a wire electrode are commonly presently used in making precise cuts on various electrically conductive materials, such as metals, and cutting the metal or workpiece into a given desired configuration or shape. In general, the wire electrode is caused to travel between two turning spools and a pair of wire guides wherethrough the wire travels are used to accurately situate or guide the wire at the proper location and angle with respect to the workpiece being cut. The wire and workpiece are placed at different electrical potentials, and a controlled electric spark traveling between the wire and workpiece causes the workpiece to be eroded and cut in the desired shape or configuration.

The position of the wire guides is controlled by mounting the wire guides to a respective upper and lower arm and selectively moving the arms and, thus, the wire guides, in a predetermined desired direction. The wire guides are also quite often part of an overall guide assembly adapted for flushing the wire guide with EDM electrolytes or dielectrics such as deionized water, petroleum based liquids, water with additives and other liquids, hereinafter collectively referred to as EDM liquids, for cooling the guide assembly and flushing the workpiece.

The older wire guides as, for example, is disclosed in Haug et al., U.S. Pat. No. 4,250,371 utilized grooved guides for positioning the wire electrode with respect to the workpiece. Further, the grooved guide was made of a non-conductive material, such as sapphire. A disadvantage with the grooved guides is that they are, in essence, unidirectional.

Other wire electrode guides utilize a hole or bore slightly larger in diameter than the wire electrode for guiding the wire and are, thus, multidirectional. An example of one such wire guide is disclosed in Ichikawa, U.S. Pat. No. 4,613,740. The wear resistance of the multidirectional wire guides was increased by employing a diamond guide member with a cylindrical hole and mounted in a sintered metal. Furthermore, a non-conductive cap, as disclosed in Ichikawa, U.S. Pat. No. 4,613,740 was employed at the tip of the guide and facing the workpiece so as to prevent electroerosion thereat to the wire guide.

The prior multidirectional wire guides, however, have substantial shortcomings and drawbacks. Most importantly, it has been found that over a generally short period of time, the mount around the diamond guide member deteriorates and/or the guide member becomes loose or breaks away from its mount thereby rendering the guide incapable of accurate placement or guidance of the wire electrode and, therefore, also useless. The deterioration of the mount may also create ledges or rough areas, thus, making automatic threading or manual threading difficult or time-consuming because the wire becomes caught on the formed ledges or rough areas. Although the diamond guide member is wear-resistant with regard to the friction of the wire electrode in the diamond guide hole, the life span of the guide is substantially decreased in view of the diamond guide member becoming loose or breaking away from its mount. Furthermore, wire guides employing non-conductive caps are also subject to this problem and are more difficult, time-consuming, and costly to manufacture.

Accordingly, a need exists for a multidirectional electrode wire guide that is less expensive to manufacture, is substantially wear-resistant and long-lasting and, further, wherein the mount is not deteriorated and the guide member is not demounted or dislodged from its mount during use.

SUMMARY OF THE INVENTION

It is the principle object of the present invention to overcome the above-discussed disadvantages associated with prior multidirectional wire electrode guides.

The present invention, in part, was conceived by recognizing and ascertaining the causes of the mount deterioration and the guide member dislodging. In general, some of the various mechanisms causing the mount deterioration and the guide member dislodging were determined to be actual spark erosion or thermal machining, electrodeposition also known as electroplating, and electrochemical corrosion also known as electrolytic corrosion and galvanic corrosion. Depending on the operation of the EDM apparatus, the type of guide assembly etc., one or more of these mechanisms may act simultaneously or after one another to erode the metal mount in the vicinity of the diamond guide member and/or the guide member itself and, thus, cause the dislodging.

More particularly, in some situations, it was discovered that the guide member mounting and, on occasion, the guide member itself were electroeroded causing the dislodging of the guide member. It is believed that this electroerosion occurs more frequently or may be initiated when the workpiece is being cut at an angle and when the wire electrode exits or enters the wire guides at an angle with respect to the axis of the guide member cylindrical hole. In this situation, because the diamond guide member is generally quite small i.e., 0.060 to 0.080 inch in diameter, as the wire exits or enters the diamond guide member, the wire, depending on the angle of the cut, is placed in close proximity to the sintered metal or conductive material surrounding the diamond guide member, thus, causing a spark between the wire and the mounting and/or the diamond guide member itself. The metal surrounding and supporting the diamond guide member can be at a sufficiently differing potential with respect to the wire electrode, especially if the normal contact assembly is not completely effective or is located at a significant distance from the guide member, so that spark erosion and thermal machining can occur between the wire electrode and the metal mount. The establishment of this electroerosion can also be abetted by impurities in the EDM liquids. Thus, the mounting erosion is initiated by sparks hitting the mounting material. As discussed hereinbelow, however, electroerosion, electrodeposition and electrochemical corrosion may also occur even when the wire electrode remains concentric with the wire guide member hole.

With respect to the electroerosion mechanism, it was further discovered that although diamond is an excellent non-conductor and the diamond guide member prevented current flow from within the diamond guide member cylindrical hole to the mounting material, when the end or tip portion of the diamond guide member situated close to the mounting was struck by a spark or otherwise affected such as by a spark travelling close to the diamond guide member, the diamond was transformed into graphite. Because graphite is conductive, it further enhanced electroerosion of the diamond guide member itself and, also, the mounting material therebehind. As small portions of the diamond guide member and mounting material are eroded, the dislodging process is accelerated due to the increasing conductivity between the wire electrode, mounting material and formed graphite.

It was also ascertained that the dislodging process via the electroerosion mechanism is aided or initiated, through the accumulation of debris, such as residue from the workpiece, near the vicinity of the diamond guide member. During the electroerosive cutting process, as the sparks from the wire electrode hit the workpiece being cut, conductive residue particles are broken away from the workpiece. These conductive particles are theoretically flushed away with the EDM liquid. However, quite often these particles find their way or are pushed by the EDM liquid near the exit or entrance of the diamond wire guide member, thus, providing the necessary conductivity or gap between the wire and mounting material near the diamond guide member so as to initiate the above-discussed dislodging erosive process.

Yet another manner in which the dislodging process via the electroerosion mechanism is enhanced or initiated, is by wire shavings or debris from the wire electrode accumulating near the diamond guide member. It was discovered that shavings from the wire electrode or other conductive particles in the EDM liquid or fluid found their way or were forced in a position for providing the necessary conductivity or gaping between the wire electrode and mounting material and, thereby, again initiating the above-discussed electroerosive dislodging process. The EDM liquids or other non-conductive fluids used in conjunction with the wire guides have been found to be inadequate in preventing the initiation of this dislodging electroerosive process.

In some guide assemblies and EDM apparatuses, however, the diamond guide member mount is substantially at the same potential as the wire electrode and, thus, spark electroerosion or thermal machining may not be the mechanism causing the dislodging of the diamond guide member. In guide assemblies and EDM apparatuses of this character, it has been ascertained that the erosive mechanisms are electrodeposition also known as electroplating and electrochemical corrosion also known as electrolytic corrosion and galvanic corrosion. In these guide assemblies, a current pickup is generally utilized in the guide assembly for placing the necessary potential on the wire with respect to the workpiece. After the current pickup, the wire electrode does not come in contact with the guide assembly until the diamond guide member. It has been ascertained that the electrical resistance in the wire electrode between the current pickup and the diamond guide member is different from the electrical resistance in the guide assembly between the current pickup and the mount of the diamond guide member and to the wire electrode.

Also, because EDM power supplies may operate at several megahertz and the current supplied to the wire electrode is not a perfect pulsed direct current as actually desired, some current reversal is experienced in the system. Depending on the materials of the guide assembly and materials between the diamond guide member and the current pickup, a capacitive effect occurs between the current pickup and the diamond guide member mount. Thus, it has been determined that current flow exists, albeit small, between the wire electrode and the diamond guide member mount.

The small electrical current flow between the wire electrode and mount gives rise to the electrodeposition an electrochemical corrosion mechanisms. More specifically, due to this small current flow, a plating action may occur wherein the metal from the mount in the vicinity of the diamond is carried away and plated onto the wire electrode. In the alternative, ions from the metal mount in the vicinity of the diamond may combine with other metallic debris such as wire shavings and workpiece particles described hereinabove and then be carried away by the EDM liquid used for flushing.

The small current may also cause electrochemical corrosion and, thereby, enhance or initiate the dislodging process. Here, metal debris may cause the necessary interface between dissimilar metals so that electrochemical corrosion of the mount may occur. Also, other ions in the EDM liquid, under the influence of the electric current, can cause electrochemical corrosion. In the alternative, where the mount is made of a powdered metal, the powdered metals may not actually alloy and, thus, these powder particles may form an interface with the matrix metals that surround them. This interface of dissimilar metals again, in conjunction with the small current flow, causes galvanic corrosion and ultimately the deterioration of the mount and/or the dislodging of the diamond guide member.

It is believed that the above-identified mechanisms cause the erosion of the guide member mount either in combination or one after the other and, also, that other erosive mechanisms similar thereto may exist. The present invention overcomes the disadvantages associated with prior wire guides and, more importantly, overcomes mount deterioration and the dislodging or dismounting of the guide member by preventing electrical current flow between the wire electrode and the guide assembly at an area near the guide member.

In one form thereof, the present invention is directed to an electrical discharge machine wire guide mountable on a guide assembly for guiding a moving wire electrode. The wire guide includes a guide element having a wire hole for receiving the wire therethrough and guiding the wire. A non-conductive element operatively associated with the guide element is provided for preventing electrical current flow between the wire and the guide assembly at an area near the guide element.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Figure 1:
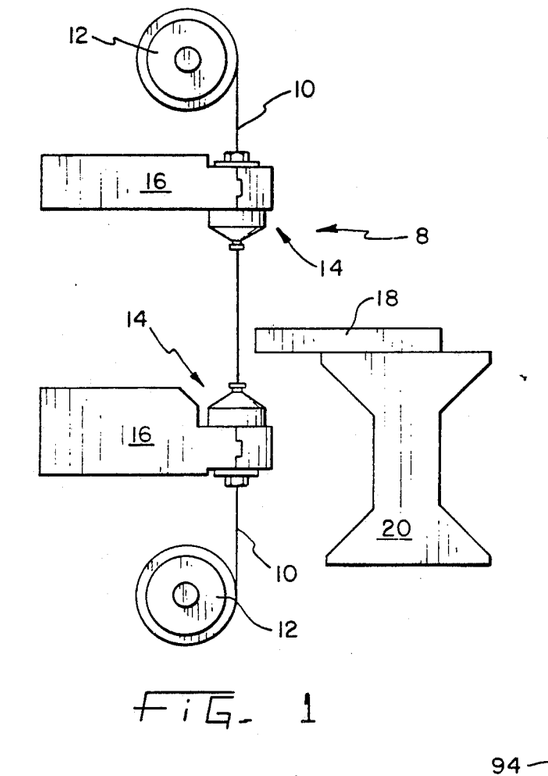
FIG. 1 is a diagrammatic side elevational view of an electrical discharge machine apparatus.

As shown in FIG. 1, the electrical discharge machine generally indicated as 8 utilizes an electrode wire 10 wrapped around spools 12 and traveling therebetween. Wire guide mounting assemblies, generally indicated as 14, are provided at the ends of arms 16, and wire 10 is received through wire guide mounting assemblies 14. Assemblies 14 are adapted for mounting a wire guide therein and, also, for flushing EDM liquid through and around the wire guide and on to workpiece 18. Workpiece 18, generally made of a conductive material, is held on table 20 so that it may be cut or shaped by wire 10. More specifically, arms 16 and/or table 20 are moved with respect to one another so that wire 10 may travel through workpiece 18 cutting and shaping the same in a predetermined desired manner. Arms 16 may also be displaced with respect to one another thereby cutting workpiece 18 at a given desired angle. The cutting and shaping of workpiece 18 is caused by the moving wire 10 as it travels between spools 12 by the placement of a different potential on wire 10 and workpiece 18, causing a spark therebetween and thereby electroeroding workpiece 18 in the proximity of the traveling wire 10.

Figure 2:
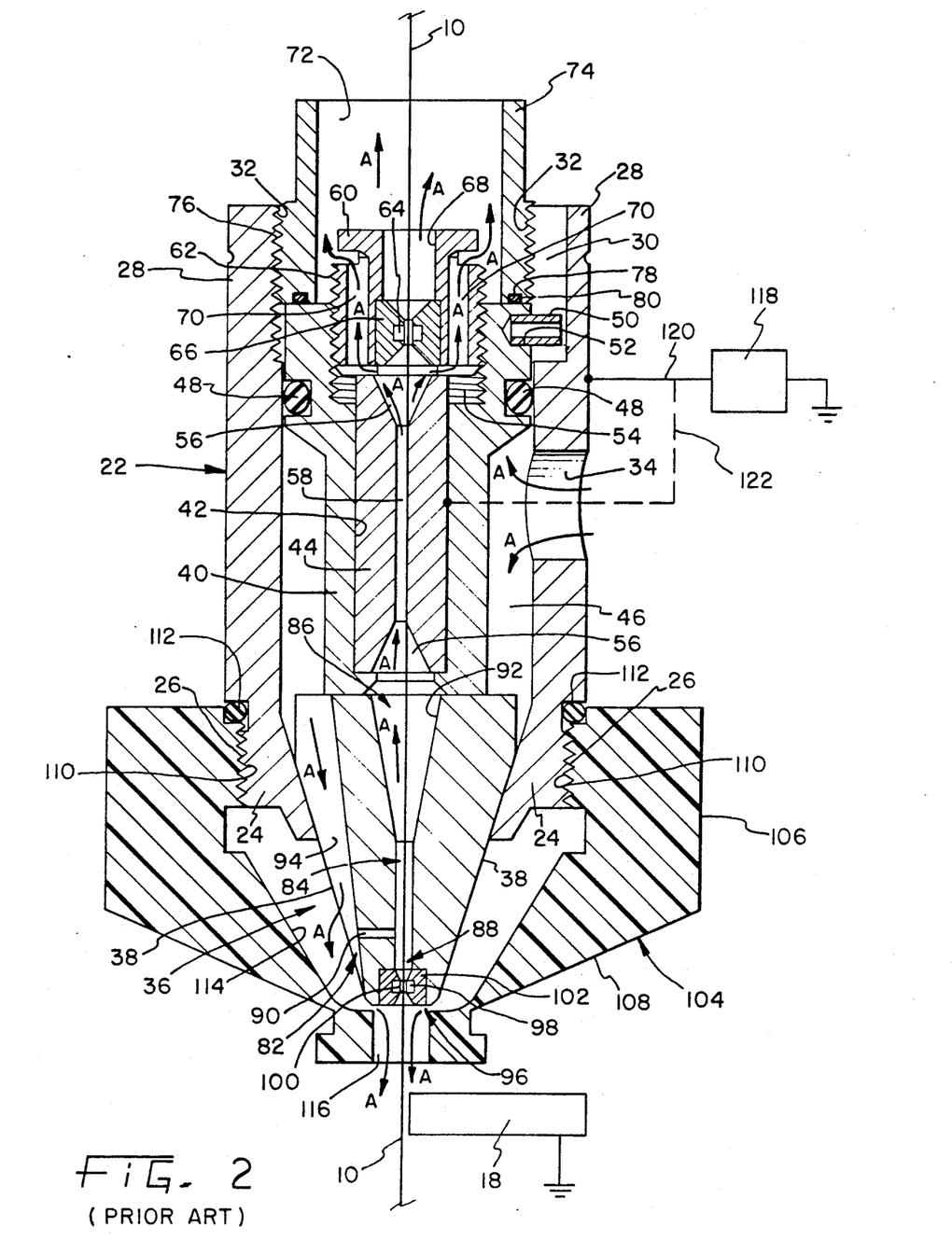
FIG. 2 is a cross-sectional view of a typical guide assembly and generally showing undesired electrical current flow.

Wire guide mounting assemblies 14 are used to more accurately locate or place wire 10 with respect to workpiece 18, place a potential on wire 10 and, also, to flush and cool workpiece 18 with an EDM liquid or the like. As shown in FIG. 2, a typical assembly 14 includes a cartridge barrel 22 having a truncated converging conical lower portion 24. The inner surface of lower truncated conical portion 24 is smooth and converging while the exterior surface thereof has formed thereon threads 26. The upper cylindrical portion 28 of barrel 22 includes a longitudinal slot 30 and threads 32 on the inner surface thereof. An EDM liquid supply hole 34 is provided on the side of barrel 22.

A precision wire guiding device generally indicated as 36, more fully described in detail hereinbelow, is received within barrel 22 and extends out of truncated converging lower conical portion 24 of barrel 22. More specifically, outer conical surfaces 38 of device 36 rest against the inner truncated conical surface of lower portion 24 of barrel 22. Device 36 is situated substantially concentrically with respect to barrel 22.

A carbide holder 40 is received in barrel 22 above device 36 and has a bore 42. Bore 42 is situated non-concentrically with respect to carbide holder 40 and receives a carbide pickup 44 therein as shown. Carbide holder 40 has a reduced outer diameter forming an annular gap 46 between the inner surface of barrel 22 and the outer reduced diameter surface of carbide holder 40. O-ring 48 located between the inner surface of barrel 22 and the upper portion of carbide holder 40 forms a seal thereat and of annular gap 46. A roll spring element 50 is received in bore 52 located in the upper portion of carbide holder 40 and extends outwardly therefrom. Element 50 is slidingly received within longitudinal slot 30 of barrel 22 and acts to retain carbide holder 40 in an aligned radial relation with barrel 22. The upper portion of carbide holder 40 further includes an eccentric bore having threads 54 formed therein. The lower portion of carbide holder 40 rests against the upper portion of guiding device 36.

Carbide pickup 44 includes two truncated conical portions 56 leading to and communicating with a longitudinal hole 58. Wire 10 is in sliding contact or rubs against the inner surface of longitudinal hole 58 of carbide pickup 44 and an electrical potential or current is placed on wire 10 by this contact through the carbide pickup 44.

Carbide pickup 44 is retained within bore 42 through the use of preguide retaining nut 60 having threads 62 mating with threads 54 of carbide holder 40. Preguide retaining nut 60 includes a diamond preguide member 64 having a preguide hole therethrough and being mounted in a sintered metal preguide holder 66. Preguide holder 66 is received and fixed concentrically within a bore 68 of preguide retaining nut 60. Diamond preguide member 64 acts to situate wire 10 in close proximity to its final position and also to place wire 10 in contact with carbide pickup 44. Further, preguide retaining nut 60 includes longitudinal bores 70 in communication at one end thereof with truncated conical portion 56 and hole 58 of carbide pickup 44 and at the other end thereof with bore 72 of retaining nut 74.

Retaining nut 74 includes external threads 76 and an annular recess 78 for receiving therein O-ring 80.

Threads 76 of retaining nut 74 mate with threads 32 of barrel 22 and retaining nut 74 is thus received within barrel 22 and bears against the upper portion of carbide holder 40 retaining the same within barrel 22. O-ring 80 provides a cushion between retaining nut 74 and the upper portion of carbide holder 40.

Wire guiding device 36, more specifically, includes a guide body generally indicated as 82. A wire hole or duct 84 extends through body 82 and includes a first opening or duct opening 86 at one end of duct 84 and body 82 and a second opening or duct opening 88 at the other end of duct 84 and body 82. An EDM liquid passage 90 communicates between wire duct 84 and the exterior of body 82 and provides a passage through which the EDM liquid may travel from the outside of body 82 to wire duct 84. Towards the first opening 86, wire duct 84 includes a truncated conical portion 92 increasing in size towards first opening 86.

The exterior of wire guiding device 36 includes EDM liquid passage slots 94. EDM liquid under pressure within annular gap 46 travels out from within barrel 22 and downwardly through passage slots 94 of device 36. An enlarged bore portion 96 is provided at one end of wire hole or duct 84 at the second opening 88 thereof. Wear resistant member 98 is fixed in insert or nib 102 and nib 102 is, in turn, fixed within bore portion 96. Wear resistant member 98 is made of diamond and has a hole 100 therethrough substantially coaxial with wire duct 84. Nib 102 is made of a sintered metal material and acts to rigidly hold wear resistant member 98 in position substantially concentrically with wire duct 84.

A nozzle member 104 is provided generally surrounding wire guide device 36 and is threadably connected to lower conical portion 24 of barrel 22. Nozzle member 104 has an upper generally cylindrical-shaped portion 106 and a lower conical-shaped portion 108. Threads 110 are formed on the inner surface of upper cylindrically-shaped portion 106 of nozzle member 104 and are adapted to mate with threads 26 of barrel 22. Accordingly, nozzle member 104 is threadably attached to barrel 22 via threads 26 and 110 and an O-ring 112 is provided therebetween for creating a seal between nozzle member 104 and barrel 22. Lower conical-shaped portion 108 of nozzle member 104 includes a truncated conical inner surface 114 converging generally downwardly toward discharge hole 116. An EDM liquid is discharged through discharge hole 116 from within nozzle member 104 and outwardly toward a workpiece 18.

During operation of the electrical discharge machine, and while wire 10 is traveling through assembly 14 and wire guiding device 36, EDM liquid under pressure is supplied to assembly 14 through hole 34 as indicated by arrows A. The EDM liquid travels throughout assembly 14 as indicated by arrows A and, thus, cooling the same. More specifically, EDM liquid entering through hole 34 and into annular gap 46 travels to within nozzle member 104 through liquid passage slots 94 and, thereafter, is discharged through discharge hole 116 flushing workpiece 18, cleaning the same, and moving the eroded particles of workpiece 18 away from the work cutting area. In addition, EDM liquid enters guide device 36 through water passage 90 and, thus, into wire duct 84. The EDM liquid within duct 84 then travels upwardly within wire duct 84, hole 58 of carbide pickup 44 and through diamond preguide member 64. It should also be noted that EDM liquid also travels through longitudinal bores 70 of preguide retaining nut 60, cooling the same and moving gases formed within the carbide pickup 44 out therefrom and finally exiting through bore 72 of retaining nut 74. The EDM liquid within duct 84 also travels downwardly through guide member wire hole 100.

As shown in FIG. 2, an EDM power supply and control unit, schematically indicated as 118, provides pulsed current at several megahertz with respect to ground. A power supply wire 120 is connected between barrel 22 and power supply 118. Barrel 22, carbide holder 40 and guide body 82 are made of metallic materials, preferably stainless steel and, thus, current is transferred to carbide current pickup 44. When power supply wire 120 is connected to barrel 22, current flows to carbide current pickup 44 either from barrel 22 through carbide holder 40 to pickup 44 or, through barrel 22, guide body 82, carbide holder 40 and then to carbide pickup 44.

In the alternative, as shown by the dashed line, power supply wire line 122 is provided and connected directly to carbide pickup 44 for placing a potential on wire 10 with respect to grounded workpiece 18. It should also be noted that in all EDM apparatuses, an upper and lower assembly 14 is provided as shown in FIG. 1. Furthermore, current may be placed on wire 10 at either the upper or lower assembly 14 or at both upper and lower assemblies 14.

Whether current is placed on the exterior of the assembly or barrel 22 or directly onto carbide pickup 44, it has been ascertained and determined that all of the current delivered via power supply wires 120 or 122 is not transferred to wire 10 and, thereafter, via a spark to workpiece 18 and ground. In fact, because of the close proximity of wire 10 to wear resistant diamond member 98 and nib 102, shown in FIG. 2 made of sintered metal, electrical current flow may occur between wire 10 and the nib area close to wire hole 100. Although the resistance between wire 10 and sintered metal nib 102 may be somewhat large, depending on the distance between wire 10 and nib 102, the size of the diamond wear-resistant member 98, impurities that may exist in the EDM liquid, accumulation of debris, etc., the resistance thereat is not large enough to prevent all current flow and, thus, a small amount of current, possibly in the milliampere range, occurs between the wire 10 and nib 102.

Figure 3:
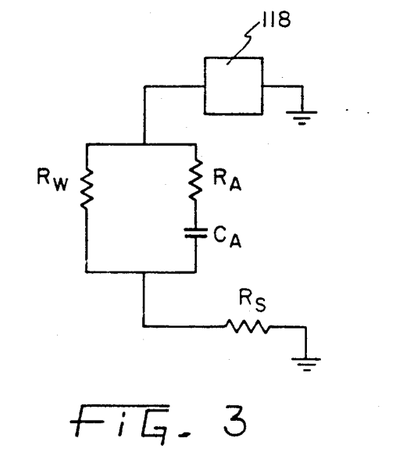
FIG. 3 is a schematic diagram of undesired electrical current flow in a typical guide assembly.
Figure 4:
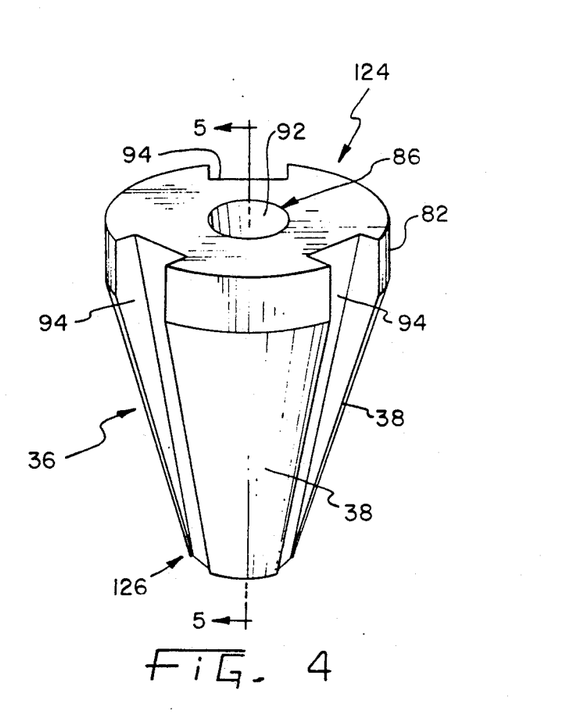
FIG. 4 is a perspective view of an electrical discharge machine wire guide for guiding an electrode wire, according to the present invention.

As shown in FIG. 3 in schematic form, a parallel circuit is formed generally between where wire 10 contacts current pickup 44 and where wire 10 is in close proximity to nib 102. More specifically, $R_W$ represents the resistance of wire 10 from between its contacting current pickup 44 and the area in close proximity to nib 102. On the other leg of the parallel circuit, $R_A$ represents the resistance and $C_A$ represents the capacitance in the assemblied components between the current pickup or EDM power supply 118 and the wire 10 in close proximity to nib 102. Finally, $R_S$ represents the resistance associated with the spark erosion process between wire 10 and workpiece 18. Depending on the thickness and composition of wire 10, the distance of wire 10 between current pickup 44 and nib 102, the efficiency of contact between wire 10 and current pickup 44, impurities, and other factors, the resistance $R_W$ will vary. Likewise, depending on the materials of the various relevant assembly 14 components, efficiency of contact between wire 10 and pickup 44, impurities, and other factors, resistance $R_A$ and capacitance $C_A$ will vary. Depending on the EDM power supply and control unit 118, there may also be current flow between wire 10 and nib 102 in both directions. This current flow is believed to be responsible for electrodeposition and/or electrochemical corrosion wherethrough nib 102 substantially near wear-resistant member 98 is eroded, thus, dislodging or demounting member 98.

Yet more severe erosion of nib 102 may occur when actual electroerosion or thermal machining occurs at nib 102. Here, failure occurs when nib 102 becomes grounded or when the potential between wire 10 and nib 102 is otherwise large and, thus, spark erosion occurs directly to nib 102. For example, where contact between wire 10 and current pickup 44 fails in whole or in part, resistance $R_W$ increases greatly compared to resistance $R_A$ and, therefore, there is greater current flow between wire 10 and nib 102 and possibly even spark erosion thereat.

By realizing the various failure mechanisms existing in an EDM guide, the inventors have conceived of means by which the numerous erosive mechanisms can be substantially eliminated and whereby the EDM guide member can be made substantially long-lasting and wear-resistant. As shown in the drawings, a non-conductive means is provided in conjunction with the wear-resistant member or guide means for preventing electrical current flow between the wire and the guide assembly at an area near the guide means. A support means is also provided for supporting the guide means generally in a position for guiding the moving electrode wire. In the embodiments shown in FIGS. 5 and 6, the support means is non-conductive and is part of the non-conductive means, while in FIGS. 7-10, the support means is not necessarily non-conductive and the non-conductive means is generally separate therefrom.

As described hereinafter in the various embodiments according to the present invention, the guide means is made of at least one highly wear-resistant material selected from a group consisting of single crystal natural diamond, synthetic single crystal diamond, polycrystalline diamond, cubic boron nitride, or any other suitable wear-resistant material. Preferably, the guide means is made of diamond. The non-conductive means, as described hereinafter in the various embodiments according to the present invention, can be made of a non-conductive material selected from a group consisting of ceramic, plastic, sapphire, quartz, diamond, glass, or any other suitable non-conductive material.

Figure 5:
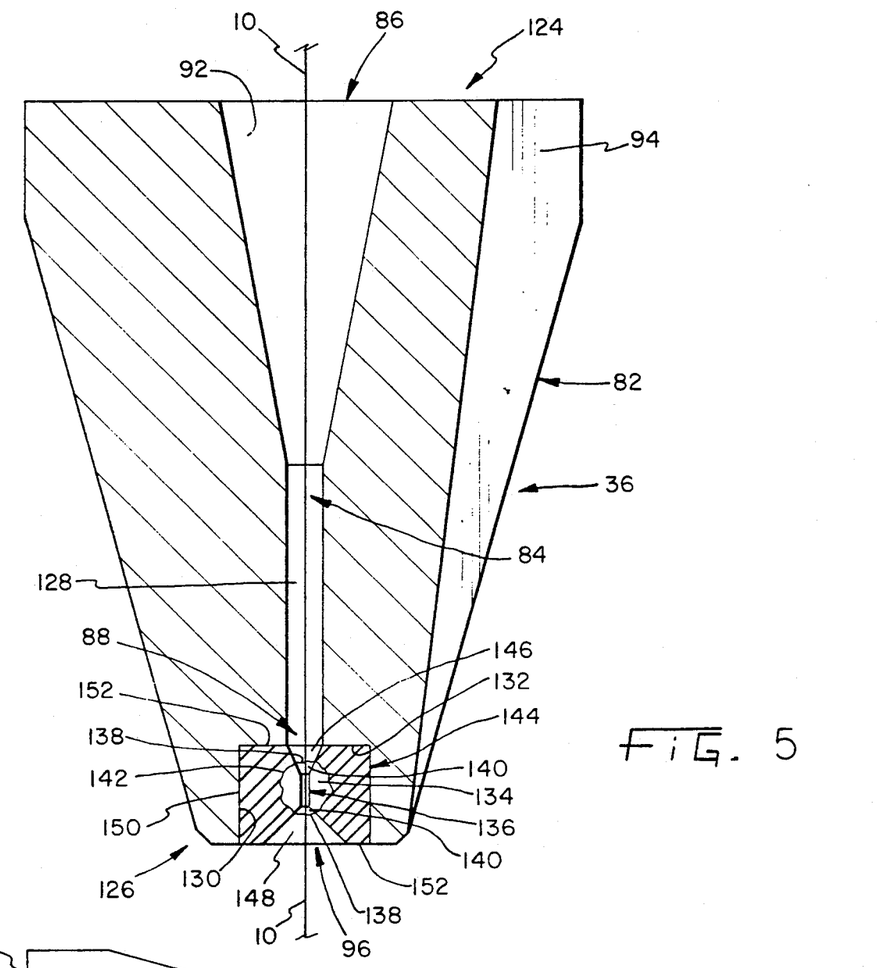
FIG. 5 is a cross-sectional view of the wire guide shown in FIG. 4 taken along line 5—5 and showing a non-conductive support.

One specific embodiment, according to the present invention, of an electrical discharge machine wire guide that is mountable on a guide assembly for guiding a moving wire electrode is shown in FIG. 5. The guide or guiding device, generally indicated as 36, includes a guide body 82 made of a metallic material and preferably stainless steel. Guide body 82 has a non-working end herein referred to as an upper end 124 and a working end herein referred to as lower end 126. Passage slots 94 extend substantially longitudinally on the outer surface of guide body 82 between upper and lower ends 124 and 126, respectively. Guide body 82 includes a wire duct generally indicated as 84 extending between upper duct opening 86 and lower duct opening 88. Wire electrode 10 is received through wire duct 84 as shown and, depending on whether wire guide 36 is used as a lower or upper guide, wire 10 may travel either upwardly or downwardly through wire duct 84. Wire duct 84 further includes a conical portion 92 converging away from upper duct opening 86 and towards a cylindrical cavity 128. At the lower duct opening 88, wire duct 84 opens into a counterbore or bore portion 96. Bore 96 includes a cylindrical surface 130 substantially coaxial with guide body wire duct 84 and being contiguous with an annular circular flat surface 132 within the bore.

In this embodiment, as shown in FIG. 5, a guide means in the form of a single crystal natural diamond member 134 is provided and having a wire hole 136 extending between wire hole openings 138. Two frusto-conical portions 140 are provided in wire hole 136 and each of the frusto-conical portions 14 converge from a respective wire hole opening 13 towards wire hole 136. Guide member 134 further includes an outer wall or surface 142 and wire hole openings 138 are located in outer wall 142. A non-conductive support means is provided in this embodiment in the form of a nib 144 made of one or more of the above-mentioned non-conductive materials. Nib 144 substantially surrounds member 134 and, by being attached to the outer wall 142 of member 134, nib 144 acts to support member 134 thereat. Nib 144 further includes an upper passageway or nib passageway 146 and a lower passageway or nib passageway 148. Both passageways 146 and 148 are frusto-conically shaped and converge toward wire hole 136. Upper passageway 146 is frusto-conically shaped so as to aid in the threading of wire 10 therethrough and passageway 148 is frusto-conically shaped so as to allow wire 10 to exit or enter wire hole 136 at an angle as may be desired during operation and also to aid in the threading of wire 10 in the opposite direction. Upper passageway 146 communicates with wire duct 84. Nib 144 has a substantially barrel-shaped exterior surface 150 and an annular circular flat surface 152 at each end thereof. Nib 144 is received within bore 96 an is attached therein to guide body 82 with an adhesive or other suitable means. Accordingly, because nib 144 is made of one or more of the above-mentioned non-conductive materials, during operation, it acts to prevent electrical current flow between wire electrode 10 and guide assembly 14 through body 82 at the area near member 134.

Figure 6:
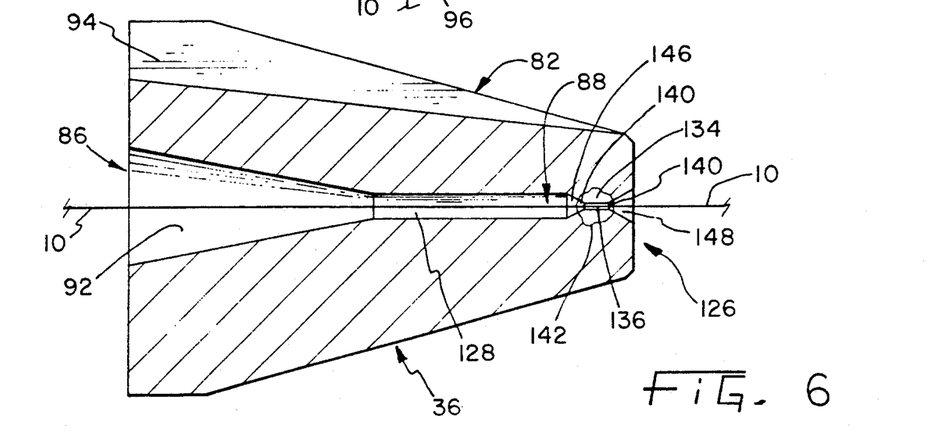
FIG. 6 is a cross-sectional view of a wire guide similar to that shown in FIG. 5 and showing the guide body as a non-conductive support.

In another embodiment wherein the support means is non-conductive, as shown in FIG. 6, a nib 144 is not used and guide body 82 is made of one or more of the above-mentioned non-conductive materials and supports member 134. As shown, guide body 82 substantially surrounds member 134 and is fixed or attached to wall 142 of member 134. In this embodiment, upper frusto-conical passageway 146 and lower frusto-conical passageway 148 are both formed in guide body 82. Upper passageway 146 communicates with wire duct 84 through duct opening 88. Guide body 82 is made of a non-conductive material and, therefore, electrical current flow is prevented between electrode wire 10 and assembly 14 from or at the area near member 134 such as passageways 146 and 148.

Figure 7:
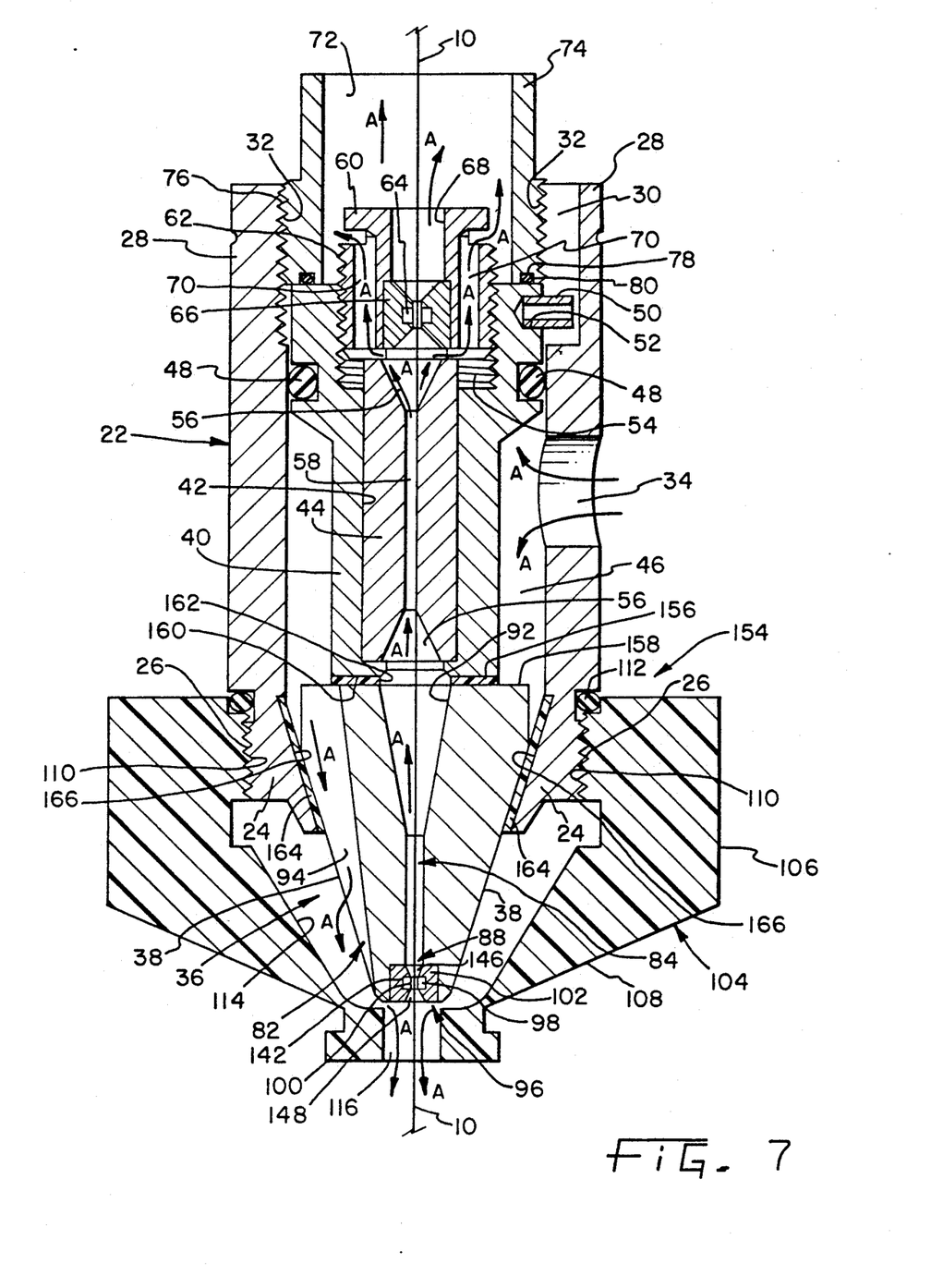
FIG. 7 is a cross-sectional view of a guide assembly and wire guide and showing non-conductive members between the guide body and the assembly according to the present invention.

In FIG. 7, there is shown an embodiment, according to the present invention, wherein the support means is not necessarily non-conductive. Preferably, guide body 82 is made of stainless steel and, nib 102 is made of a sintered metal. The wear-resistant member 98 is depicted as polycrystalline diamond and, thus, wall 142 thereof appears generally smooth and circular and with two annular flat surfaces. A guide body mounting means is provided and generally shown as 154 and, in conjunction with wire guide assembly 14, acts to mount and support guide body 82 onto assembly 14.

In this embodiment, the non-conductive means is provided and located between guide body 82 and assembly 14. More specifically, a non-conductive washer or ring member 156 is provided between upper surface 158 of guide body 82 and lower surface 160 of carbide holder 40. Non-conductive washer 156 includes an aperture 162 wherethrough electrode wire 10 may pass. In addition, a non-conductive frusto-conical sleeve 164 is provided between conical surfaces 38 of guide body 82 and inner conical surface 166 of barrel 22. As shown, sleeve 164 may be recessed into lower portion 24 of barrel 22 and, in such a structure, sleeve 164 can be made in two parts for ease of assembly. Accordingly, by locating the non-conductive means, in this embodiment sleeve 164 and washer 156 made of one or more of the above-mentioned non-conductive materials, between guide body 82 and assembly 14, electrical current flow is prevented between the wire electrode 10 and assembly 14 at an area near the guide member 98 and, therefore, the erosive mechanisms wherethrough the member 98 may be dislodged or demounted from nib 102 and/or guide body 82 in the event that a nib is not used are prevented. It should be noted that a coating of non-conductive material such as the coatings described hereinbelow may also be placed on the exterior surface of guide body 82 and, thus, serve as the non-conductive means in this embodiment.

Figures 8, 9, 10, 11, 12:
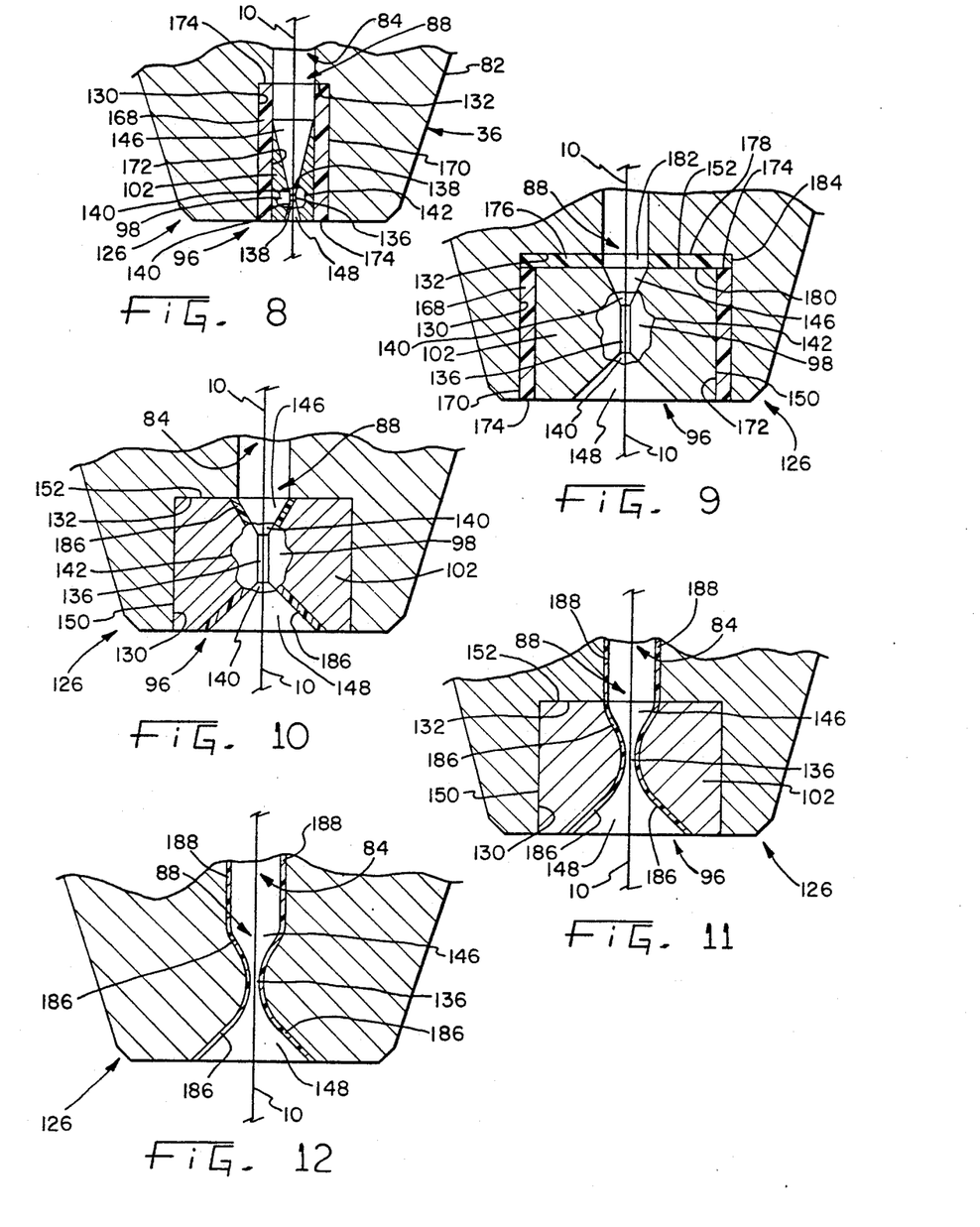
FIG. 8 is a partial cross-sectional view of a wire guide similar to that shown in FIG. 5 and showing the guide member mounted within a non-conductive sleeve according to the present invention.
FIG. 9 is a partial cross-sectional view of the wire guide shown in FIG. 8 and showing a non-conductive ring in conjunction with the non-conductive sleeve.
FIG. 10 is a partial cross-sectional view of a wire guide similar to that shown in FIG. 5, according to the present invention, and showing a non-conductive coating in the passageways leading to the guide member wire hole.
FIG. 11 is a partial cross-sectional view of a wire guide similar to that shown in FIG. 5, according to the present invention, and showing the wire electrode hole formed in a nib and showing a non-conductive coating in the passageways and the wire hole.
FIG. 12 is a partial cross-sectional view of a wire guide similar to that shown in FIG. 11 and showing the wire guide hole formed in the guide body.

Yet another embodiment wherein the support means is not necessarily non-conductive is shown in FIG. 8 wherein the non-conductive means includes a non-conductive nib sleeve 168 received within bore 96 of guide body 82. Sleeve 168 is substantially cylindrical and includes outer surface 170, inner surface 172, and annular end surfaces 174. Sleeve 168 is attached with an adhesive or other suitable means and is supported within bore 96 with outer surface 170 facing and being against cylindrical surface 130 of bore 96 and, also, with the upper annular end surface 174 being against and facing annular circular flat surface 132 of bore 96. The inner diameter of sleeve 168 is generally the same as that of wire duct 84 and a smooth transition is provided therebetween as shown. Nib 102 may be made of sintered metal and is received and attached with an adhesive or other suitable means in the non-conductive sleeve 168. As shown, upper passageway 146 and lower passageway 148 are located in nib 102 and upper passageway 146 communicates through sleeve 168 with wire duct 84. Non-conductive sleeve 168 is made of one or more of the above-mentioned non-conductive materials and, thus, prevents electrical current flow between electrode wire 10 and assembly 14 at the area near member 134.

In conjunction with non-conductive nib sleeve 168, as shown in FIG. 9, the non-conductive means may include a non-conductive annular washer or ring 176 within bore 96 and being against annular circular flat surface 132. Non-conductive ring 176 includes upper flat surface 178, lower flat surface 180, and an aperture 182 for receiving therethrough wire electrode 10. Nib 102 is received in the area formed by ring 176 and sleeve 168 with the upper surface 152 of nib 102 being against lower flat surface 180 of ring 176 and with exterior surface 150 of nib 102 being against inner surface 172 of sleeve 168. The outer diameter surface 184 of ring 176 is such that it may slip into bore 96 as shown or, in the alternative, may be smaller so that it may slip within sleeve 168, sleeve 168 being received in bore 96 up to annular circular flat surface 132. Through the utilization of ring 176, nib 102 can be more rigidly mounted than, for example, in the embodiment shown in FIG. 8 and, further, electrical current flow between the area substantially near member 134 and assembly 14 is prevented.

With respect to the embodiments shown in FIGS. 8 and 9, sleeve 168 and ring 176, made of a non-conductive material, are described hereinabove as being made as separate elements from stock non-conductive materials and, thereafter, inserted into bore 96 and attached thereat with an adhesive or other suitable means. Nib 102 may, thereafter, be directly formed in the cavity formed by sleeve 168 and ring 176 or, in the alternative, may be made separately therefrom, and inserted and attached therein with an adhesive or other suitable means. It should be noted that sleeve 168 and/or ring 176 may also be formed directly within bore 96 such as by a casting process. Thereafter, nib 102 may also be formed or cast directly within the cavity formed by sleeve 168 and ring 176 or formed separate therefrom and attached therein with an adhesive or other suitable means. In yet another alternative form, non-conductive sleeve 168 and/or non-conductive ring 176 can be formed by a coating of non-conductive material such as the coatings described hereinbelow. That is, a non-conductive coating, as described hereinbelow, may be placed directly in bore 96, thus, forming sleeve 168 and/or ring 176 in bore 96. In the alternative, a non-conductive coating may be first placed directly on nib 102, a non-conductive coating thus forming sleeve 168 and/or ring 176 thereon and, thereafter, the coated nib 102 inserted within bore 96 and attached therein with an adhesive or other suitable means.

In yet another embodiment, according to the present invention, as shown in FIG. 10, wherein the support means is not necessarily made of a non-conductive material, the non-conductive means is in the form of a non-conductive coating 186. Here, the passageways of nib 102 or guide body 82, in the event that member 134 is directly supported on guide body 82, are coated with non-conductive coating 186 by radio frequency sputtering (RF sputtering) chemical vapor deposition, physical vapor deposition, casting, or other suitable coating means. Through RF sputtering or other coating means, a glass, plastic, diamond-like carbon film, diamond film, quartz, or other suitable non-conductive coating, may be utilized for providing a non-conductive coating 186 and, thus, forming upper passageway 146 and lower passageway 148. Through the coating process, the non-conductive material may be coated or placed on substantially any surface and, as shown, by originally providing frusto-conically shaped passageways in either nib 102 or guide body 82, non-conductive coating 186 may also be frusto-conically shaped and converging toward wire hole 136. It should also be noted that through this process, if necessary, the entire wire duct 84, in addition to passageways 146 and 148, may be coated as also shown in FIGS. 11 and 12. Nevertheless, the non-conductive coating, according to the present invention, substantially prevents the dislodging or demounting of the member 134 by preventing electrical current flow between wire electrode 10 and assembly 14 through the area near guide member 98.

It should be noted that in the foregoing described embodiments, the guide means is preferably made of a highly wear-resistant material such as single crystal natural diamond, single crystal synthetic diamond, polycrystalline diamond, sapphire, and the like. These materials, although readily commercially available, tend to substantially increase in cost in direct proportion to size. Accordingly, so as to decrease overall costs of the wire guide, it is preferred that a somewhat small guide member 134 be used. Very generally speaking, for example, it is preferred that the guide member 134 be of a size such that the greatest distance between any two points on wall 142 be less than 0.200 inch and, thereby, generally not making the wire guide cost prohibitive. As can be appreciated, the non-conductive means operatively associated with and being separate from the guide means, especially where the guide means is quite small, advantageously prevents electrical current flow between wire 10 and the guide assembly 14 at the area near the guide means. That is, where the guide means such as a guide member 134 is quite small, the mount thereof be it a nib 102 or a guide body 82, tends to be much closer to the wire electrode 10 and, thus, enhancing the above-discussed corrosive mechanisms. Accordingly, the non-conductive means, by being separate from the guide means and operatively associated therewith, prevents electrical current flow between the wire 10 and the guide assembly 14 at the area near the guide means such as the passageways leading to the wire hole of the guide means.

In the embodiment shown in FIG. 11, according to the present invention, the guide means is in the form of a nib 102 made of a conductive or a non-conductive material and having a wire hole 136 formed therethrough. Passageways 146 and 148, in this embodiment formed in nib 102, are larger in diameter than wire hole 136 and generally frusto-conically shaped and converging toward the wire hole 136. The non-conductive means is in the form of a non-conductive coating 186 received on the surface of passageways 146 and 148 and wire hole 136. As with the embodiment shown in FIG. 10, the non-conductive coating 186 may be applied by RF sputtering, chemical vapor deposition, physical vapor deposition, casting, or by any other suitable coating means. The coating material may be glass, plastic, diamond-like carbon film, diamond film, quartz, or other suitable non-conductive materials capable of being coated or cast on the passageways 146 and 148 and wire hole 136. The non-conductive coating 186 prevents electrical current flow between the wire electrode 10 and guide assembly 14 at the area near the guide means which, in this embodiment, is formed in nib 102. Accordingly, the area near wire hole 136, including passageways 146 and 148, are prevented from deteriorating and ledges and rough spots are prevented from forming thereon. Thus, the wire guide retains its integrity and may easily be threaded automatically or manually for a longer period of time.

So as to further enhance the operation of the embodiment shown in FIG. 11 and the other embodiments disclosed herein, according to the present invention, a wire duct coating 188 of a non-conductive material may also be used for coating the inner surface of guide body wire duct 84.

In yet another embodiment similar to that shown in FIG. 11, as shown in FIG. 12, the guide means may be in the form of a wire hole 136 formed in guide body 82. The passageways 146 and 148 are formed in the guide body 82 and passageway 146 communicates with the wire duct 84 also formed in guide body 82. Like the embodiment shown in FIG. 11, the non-conductive means is in the form of a non-conductive coating placed on the passageways 146 and 148 and on wire hole 136 and, if desired in the wire duct 84.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An electrical discharge machine wire guide mountable on a guide assembly for guiding a moving wire electrode, said guide comprising:

guide means having a wire hole extending between two openings for receiving the wire therethrough and guiding the wire;

a nib supporting said guide means, said nib having two passageways, each of said passageways communicating through a respective guide means wire hole opening with said guide means wire hole;

a wire guide body, said nib attached to said wire guide body; and, a coating of non-conductive material on at least one of said nib passageways for preventing electrical current flow between the wire and the guide assembly.

2. The electrical discharge machine wire guide of claim 1 further comprising a coating of non-conductive material on the other of said passageways.

3. The electrical discharge machine wire guide of claim 1 wherein said coating of non-conductive material is made of at least one substantially non-conductive material selected from a group consisting of ceramic, plastic, sapphire, quartz, diamond-like carbon film, diamond film and glass.

4. The electrical discharge machine wire guide of claim 1 wherein said passageway coated with a coating of non-conductive material is frusto-conically shaped and converging toward said wire hole of said guide means.

5. An electrical discharge machine wire guide mountable on a guide assembly for guiding a moving wire electrode, said guide comprising:

guide means having a wire hole extending between two openings for receiving the wire therethrough and guiding the wire;

a nib supporting said guide means;

a wire guide body having a wire duct extending therethrough between two duct openings;

a sleeve made of non-conductive material for preventing electrical current flow between the wire and the guide body, said sleeve mounted in said wire duct and said nib mounted in said non-conductive sleeve.

6. The electrical discharge machine wire guide of claim 5 wherein said wire duct and said wire hole are substantially coaxial.

7. The electrical discharge machine wire guide of claim 5 wherein said sleeve is made of at least one substantially non-conductive material selected from a group consisting of ceramic, plastic, sapphire, quartz, diamond, and glass.

8. The electrical discharge machine wire guide of claim 5 wherein said nib has two passageways, each of said passageways communicating through a respective guide means wire hole opening with said wire hole.

9. The electrical discharge machine wire guide of claim 5 wherein said guide body includes a bore at one end of said wire duct having a cylindrical surface substantially coaxial with said guide body wire duct and contiguous with an annular circular flat surface within said bore, and further including an annular ring made of a non-conductive material received in said bore against said annular circular flat surface and wherein said sleeve is received in said bore.

10. The electrical discharge machine wire guide of claim 9 wherein said annular ring and sleeve are made of at least one substantially non-conductive material selected from a group consisting of ceramic, plastic, sapphire, quartz, diamond, and glass.

11. An electrical discharge machine wire guide mountable on a guide assembly for guiding a moving wire electrode, said guide comprising:
- guide means having a wire hole extending between two openings for receiving the wire therethrough and guiding the wire;
- non-conductive means operatively associated with said guide means for preventing electrical current flow between the wire and the guide assembly;
- support means for supporting and generally surrounding said guide means, said support means having two passageways, each of said passageways communicating through a respective wire hole opening in said guide means with said wire hole; and,
- wherein said non-conductive means is a coating of non-conductive material on at least one of said passageways.

12. An electrical discharge machine wire guide mountable on a guide assembly for guiding a moving wire electrode, said guide comprising:
- guide means having a wire hole extending between two openings for receiving the wire therethrough and guiding the wire;
- non-conductive means operatively associated with said guide means for preventing electrical current flow between the wire and the guide assembly near said guide means wire hole;
- support means for supporting and generally surrounding said guide means, said support means having two passageways, each of said passageways communicating through a respective guide means wire hole opening with said guide means wire hole;
- wherein said support means is a guide body having a wire duct extending therethrough between two duct openings, one of said support means passageways communicating with said wire duct near one of said duct openings; and,
- wherein said non-conductive means is a coating of non-conductive material on at least one of said support means passageways.

13. The electrical discharge machine wire guide of claim 12 further comprising a coating of non-conductive material on the other of said passageways.

14. The electrical discharge machine wire guide of claim 12 wherein said coating of non-conductive material is made of at least one substantially non-conductive material selected from a group consisting of ceramic, plastic, sapphire, quartz, diamond-like carbon film, diamond film and glass.

15. The electrical discharge machine wire guide of claim 12 wherein said passageway coating with a coating of non-conductive material is frusto-conically shaped and converging toward said guide means wire hole.

16. An electrical discharge machine wire guide mounted on a guide assembly for guiding a moving wire electrode, said guide comprising:
- guide means having a wire hole extending between two openings for receiving the wire therethrough and guiding the wire;
- non-conductive means operatively associated with said guide means for preventing electrical current flow between the wire and the guide assembly near said guide means;
- a guide body having a wire duct extending therethrough between two duct openings, said guide means mounted in said wire duct and said wire hole communicating with said wire duct near one of said duct openings; and,
- guide body mounting means for mounting said guide body to the guide assembly, said non-conductive means located between said guide body and the guide assembly.

17. An electrical discharge machine wire guide mountable on a guide assembly for guiding a moving wire electrode, said guide comprising:
- guide means having a wire hole for receiving the wire therethrough and guiding the wire;
- non-conductive means operatively associated with said guide means for preventing electrical current flow between the wire and the guide assembly at an area near said guide means; and
- wherein said guide means includes two passageways, each of said passageways communicating with said wire hole and said passageways being larger than said wire hole and converging toward said wire hole, and wherein said non-conductive means is a coating of non-conductive material on said passageways and said wire hole.

18. The electrical discharge machine wire guide of claim 17 wherein said coating of non-conductive material is made of at least one substantially non-conductive material selected form a group consisting of ceramic, plastic, sapphire, quartz, diamond-like carbon film, diamond film and glass.

19. The electrical discharge machine wire guide of claim 17 wherein said wire hole and said passageways are formed in a nib, said nib being attached to a guide body having a wire duct, said wire duct communicating with said wire hole through one of said passageways.

20. The electrical discharge machine wire guide of claim 17 wherein said wire hole and passageways are formed in a guide body, said guide body including a wire duct communicating with said wire hole through one of said passageways.

21. The electrical discharge machine wire guide of claim 20 wherein said guide body wire duct is coated with a non-conductive material.

* * * * *

UNITED STATES PATENT AND TRADEMARK OFFICE
CERTIFICATE OF CORRECTION

PATENT NO. : 5,073,690

DATED : December 17, 1991

INVENTOR(S) : Lawrence W. Corbin et al.

It is certified that error appears in the above-identified patent and that said Letters Patent is hereby corrected as shown below:

Column 8, line 54, change "CA" to --$C_A$--.

Signed and Sealed this

Sixteenth Day of March, 1993

*Attest:*

STEPHEN G. KUNIN

*Attesting Officer*     *Acting Commissioner of Patents and Trademarks*